W. G. DUNN.
COUNTERBALANCED CRANK SHAFT.
APPLICATION FILED MAR. 28, 1918.
1,275,140.
Patented Aug. 6, 1918.
2 SHEETS—SHEET 1.
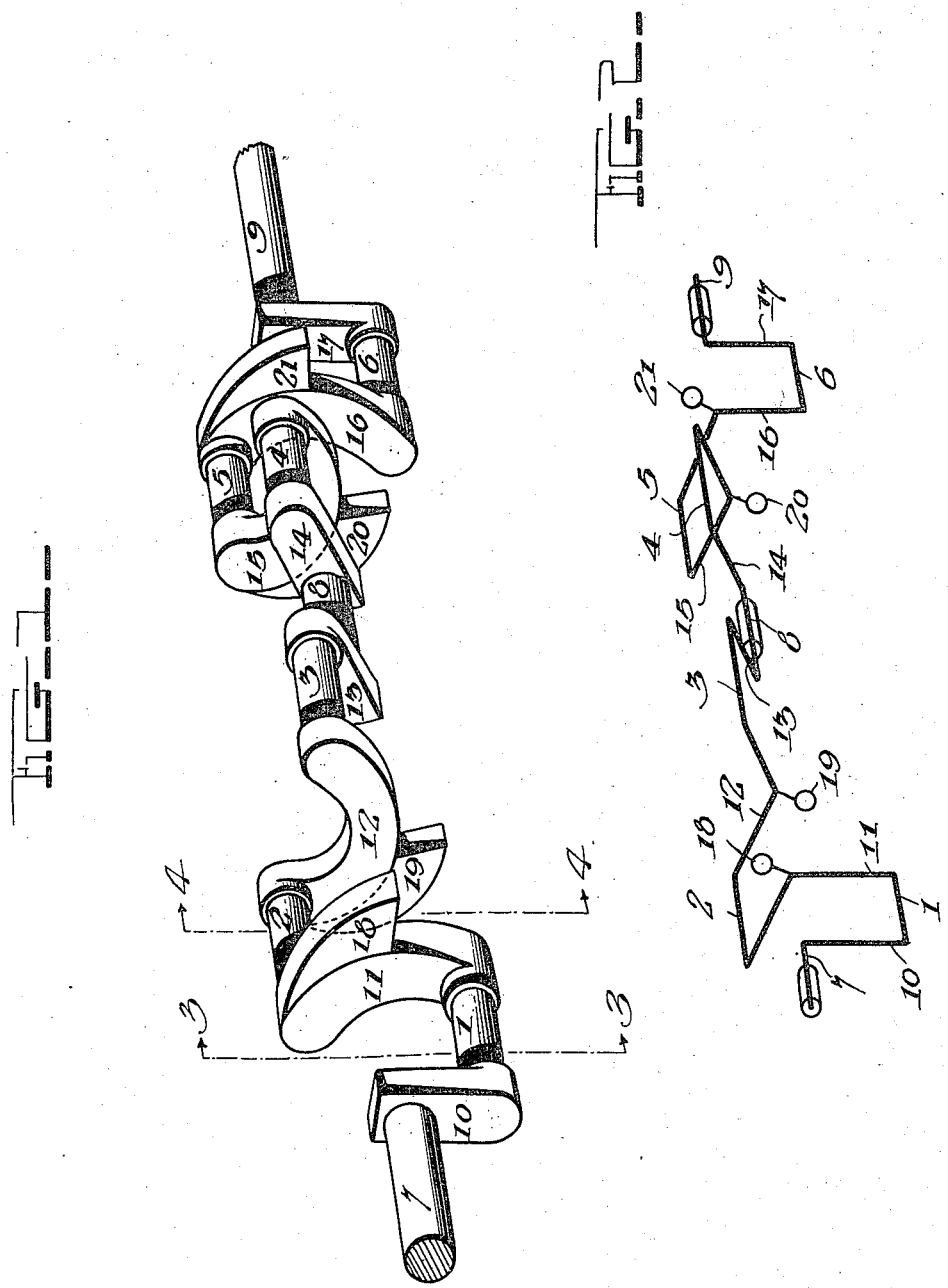
Witness
H. Woodard
Inventor
W. G. Dunn
By H. B. Willson & Co.
Attorneys W. G. DUNN.
COUNTERBALANCED CRANK SHAFT.
APPLICATION FILED MAR. 28, 1918.
1,275,140.
Patented Aug. 6, 1918.
2 SHEETS—SHEET 2.
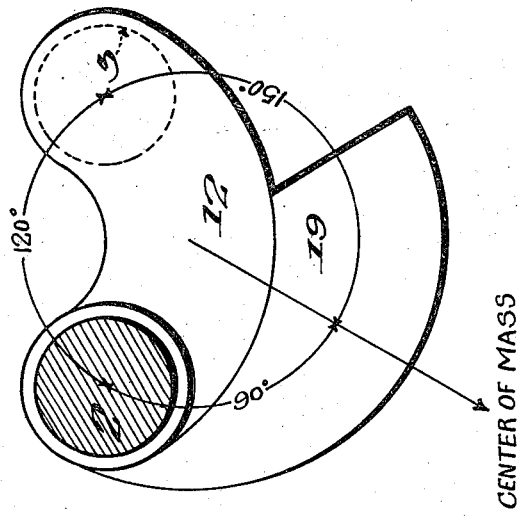
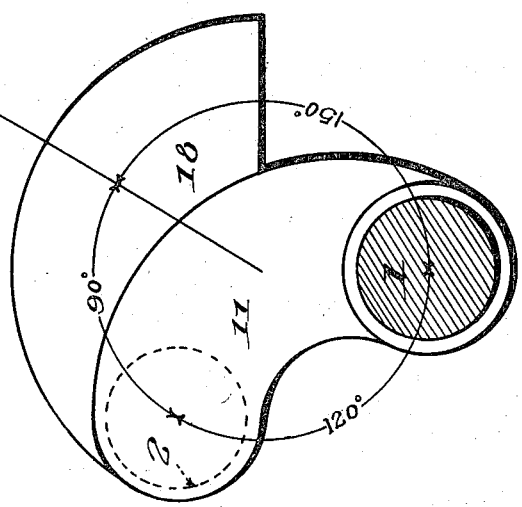
Witness
H. Woodard
Inventor
W. G. Dunn
By H. B. Willson & Co.
Attorneys

UNITED STATES PATENT OFFICE.

WILLIAM G. DUNN, OF CLARINDA, IOWA.

COUNTERBALANCED CRANK-SHAFT.

1,275,140.  Specification of Letters Patent.  Patented Aug. 6, 1918.

Application filed March 28, 1918. Serial No. 225,279.

*To all whom it may concern:*

Be it known that I, WILLIAM G. DUNN, a citizen of the United States, residing at Clarinda, in the county of Page and State of Iowa, have invented certain new and useful Improvements in Counterbalanced Crank-Shafts; and I do declare the following to be a full, clear, and exact description of the invention, such as will enable others skilled in the art to which it appertains to make and use the same.

My invention has for its object to counterbalance a multi-throw crank shaft by the provision of as few counterbalancing weights as possible, it having been found that four weights arranged as herein described will produce results upon a six throw crank shaft equally as advantageous as the shafts heretofore using as many as eight weights.

With the foregoing general object in view, the invention resides in the arrangement of weights on the crank shaft as hereinafter fully described and claimed, and shown in the accompanying drawings wherein:

Figure 1 is a perspective view of a six throw crank shaft embodying my invention;

Fig. 2 is a diagrammatic perspective view of the crank shaft showing more clearly the disposition of the centers of mass of the several counterbalancing weights; and Figs. 3 and 4 are transverse sections on the planes of the lines 3—3 and 4—4 respectively of Fig. 1.

In the drawings above briefly described, the numerals 1, 2, 3, 4, 5, and 6 designate the six crank pins of a six throw crank shaft for internal combustion engines, while the numerals 7, 8 and 9 refer respectively to the front, central and rear bearing journals of the shaft. The several crank pins are spaced apart 120 degrees as shown clearly in Figs. 3 and 4 and said pins are connected by crank arms as follows, four short crank arms and four long crank arms being employed: A short crank arm 10 connects journal 7 with the front end of pin 1, a long crank arm 11 connects the adjacent ends of pins 1 and 2, another long crank arm 12 joins pin 2 with pin 3 and a short crank arm 13 connects said pin 3 with the central journal 8; a short crank arm 14 connects journal 8 with pin 4, a long arm 15 connects the adjacent ends of the pins 4 and 5, another long crank arm 16 connects the pins 5 and 6, and a short arm 17 extends from pin 6 to journal 9. As shown clearly in Figs. 1 and 2, the crank arms 11 and 12 curve in opposite directions from the crank pin 2 to the crank pins 1 and 3, and similarly the arms 15 and 16 curve oppositely from pin 5 to the pins 4 and 6.

The crank shaft so far described is of the form commonly employed in six cylinder internal combustion engines and it has been found highly advantageous to counterbalance the crank pins and crank arms by the provision of weights. I do not claim any broad novelty in the counterbalancing of multi-throw crank shafts by the provision of weights, but my improvements reside in so locating a relatively small number of counterbalances as to produce results equal in advantage to the shafts which have heretofore employed as high as eight counterbalances. In attaining this end, counterbalancing weights 18, 19, 20 and 21 are cast integrally with or suitably secured to the long crank arms 11, 12, 15 and 16. These weights are mounted on the convex edges of the long crank arms and their centers of mass are located as shown more particularly in Figs. 2, 3 and 4. The centers of mass of each weight is spaced approximately 90 degrees from the crank pin at one end of its long crank arm and substantially 150 degrees from the crank pin at the other end of the arm as indicated clearly in Figs. 3 and 4. By this arrangement, each of the counterbalancing weights will counterbalance the long crank arm upon which it is carried, the portions of the crank pins connected to said arm, and the adjacent short crank arm. For instance, the weight 18 counterbalances the arm 11, half of the crank pin 2, all of crank pin 1, and the short crank arm 10, while the weight 19 counterbalances arm 12, half of crank pin 2, all of crank pin 3, and crank arm 13. The action of the two rear weights 20 and 21 is identical with that of 18 and 19 and need not therefore be described in detail.

The counterbalancing weights are by preference shaped as shown in Figs. 1, 2 and 3, but I wish it understood that the exact configuration of these weights does not enter into the present invention since they may be of any appropriate contour. Furthermore, it is obvious that if the shaft were constructed with the long crank arms 11, 12, 15 and 16 of rectilinear formation rather than curved, the shape and disposition of the counterbalances would necessarily be changed accordingly. Also, although the angular relation of the centers of mass of the several counterbalances is preferably as above pointed out, different styles of crank shafts may dictate slight changes. My invention is not therefore restricted to such minor details. It is essential however that the counterbalances be carried by opposite edges of each pair of long crank arms and that the centers of mass of said counterbalances shall be located to produce the required result.

From the foregoing, taken in connection with the accompanying drawings, it will be obvious that I have greatly simplified the construction of multi-throw crank shafts, yet that no advantages are sacrificed. In attaining the end sought, the arrangement shown and described is preferably employed, but within the scope of the invention as claimed, considerable latitude is allowed for adapting the inventive idea to different forms of crank shafts.

I claim:

1. In a counterbalanced crank shaft, the combination of a six throw shaft having six crank pins, four long crank arms, and four short crank arms; together with counterbalancing means for said shaft consisting totally of four weights carried one by each of said long crank arms, the weights of the front and rear arms being opposed to those of the next adjacent arms, the centers of mass of said weights being located to balance the long crank arms and the portions of the crank pins attached thereto and in addition the short crank arms and the ends of the crank pins attached to the latter.

2. A structure as specified in claim 1, said crank pins being spaced apart 120 degrees, and said centers of mass being spaced approximately 90 degrees from the crank pin at one end of each long crank arm and substantially 150 degrees from the pin at the other end thereof.

3. A structure as specified in claim 1, said long crank arms being curved oppositely from the second and fifth crank pins to the adjacent pins, and said weights being mounted on the convex edges of said arms.

4. In a counterbalanced crank shaft, the combination of a shaft having a pair of long crank arms connected at one end by a crank pin, additional crank pins joined to the other ends of said crank arms, the three crank pins being spaced 120 degrees apart, short crank arms joined to said additional crank pins, and bearing journals carrying said short crank arms; together with a pair of counterbalancing weights carried one by each of said long crank arms, the weight of one arm being opposed to that of the other arm and said weights having their centers of mass located to balance both long crank arms, both short crank arms and the three crank pins.

5. A structure as specified in claim 4, said centers of mass being spaced approximately 90 degrees from the first named crank pin and substantially 150 degrees from said additional pins.

6. A structure as specified in claim 4, said long crank arms being curved oppositely from said first named crank pin to said additional crank pins and said weights being located on the convex edges of said arms.

In testimony whereof I have hereunto set my hand in the presence of two subscribing witnesses.

WILLIAM G. DUNN.

Witnesses:
W. M. BLACK,
R. E. SEIFERT.